United States Patent [19]
Matulin et al.

[11] Patent Number: 5,478,130
[45] Date of Patent: Dec. 26, 1995

[54] AUXILIARY TAILGATE APPARATUS

[76] Inventors: Frederick E. Matulin; Christopher A. Matulin, both of 1742 Heatherbrae Ave., Tucson, Ariz. 85715

[21] Appl. No.: 344,968

[22] Filed: Nov. 25, 1994

[51] Int. Cl.⁶ .................................................. B62D 25/00
[52] U.S. Cl. ............................................. 296/57.1; 296/51
[58] Field of Search .............................. 296/51, 37.6, 26, 296/57.1, 61

[56] References Cited

U.S. PATENT DOCUMENTS

| | | | |
|---|---|---|---|
| 2,872,239 | 2/1959 | Bowness | 296/57.1 X |
| 4,023,850 | 5/1977 | Tillery . | |
| 4,114,944 | 9/1978 | Joynt et al. . | |
| 4,472,639 | 9/1984 | Bianchi | 296/57.1 X |
| 4,531,773 | 7/1985 | Smith . | |
| 4,778,213 | 10/1988 | Palmer . | |
| 4,889,378 | 12/1989 | Sims | 296/57.1 |
| 5,116,096 | 5/1992 | Taylor . | |
| 5,133,584 | 7/1992 | McCleary . | |

*Primary Examiner*—Joseph D. Pape

[57] ABSTRACT

An auxiliary tailgate apparatus is adapted for installation on an original tailgate and includes a base assembly adapted to be attached to the original tailgate. A gate assembly includes a proximal end and a distal end. A pair of pivot assemblies connect the proximal end of the gate assembly with the base assembly. A first lock assembly, supported by either the gate assembly or the base assembly, is provided for selectively locking the gate assembly in a vertical orientation with respect to the base assembly or selectively permitting the gate assembly to rotate around the pivot assemblies for permitting the gate assembly to be oriented in a non-vertical orientation with respect to the base assembly. When the first lock assembly is supported by the base assembly, the first lock assembly includes a lock pin assembly which includes a pin member adapted to be placed in registration with a locking well located in the gate assembly for locking the gate assembly in a vertical orientation. The base assembly may include a pair of fixed base units fixedly attached to the original tailgate and a pair of telescopically adjustable extension members in sliding engagement with the pair of fixed base units. A pair of second lock assemblies selectively lock the adjustable extension members in selected adjustments with respect to the fixed base units.

9 Claims, 4 Drawing Sheets

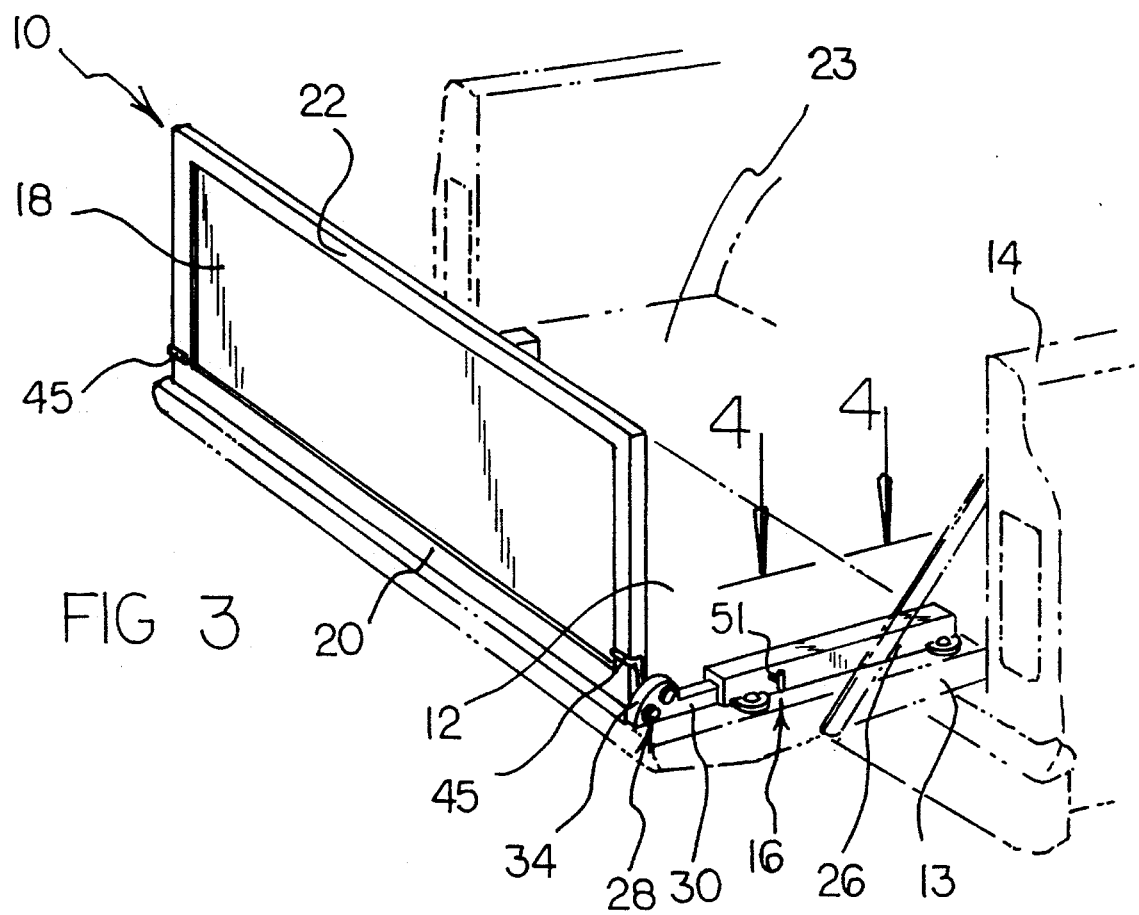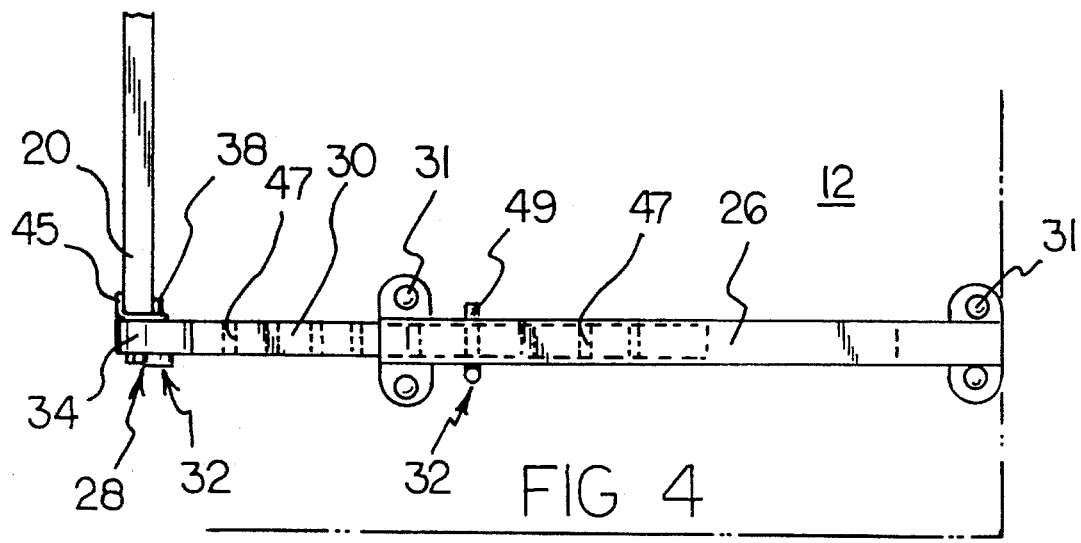

AUXILIARY TAILGATE APPARATUS

BACKGROUND OF THE INVENTION

1. Field of the Invention

The present invention relates generally to tailgates on pickup trucks and station wagons and, more particularly, to devices especially adapted for attaching to the tailgates.

2. Description of the Prior Art

Pickup trucks have truck beds for carrying loads and tailgates for retaining the loads on the beds. More specifically, when a tailgate is in an up or vertical orientation, the tailgate serves to confine the load to the truck bed area. However, the tailgate is generally lowered in order to load and unload the truck bed. There may be times, however, when the length of a load is greater than the length of the truck bed. In such a case, the tailgate may be left in a lowered or horizontal orientation when the lengthy load is carried. A problem exists, however, with the tailgate in the lowered position. That is, the load is no longer confined by a vertically oriented tailgate. In this respect, it would be desirable if a device were provided that helped confine a lengthy load on a truck bed even though the tailgate is in a lowered position.

When a lengthy load extends out from a truck bed and over a tailgate in a lowered position, it would be desirable if a device were provided that included an auxiliary, vertically-oriented tailgate that serves to confine the lengthy load onto the truck bed, even with the original tailgate in the lowered position.

There are some lengthy loads whose length even exceeds the sum of the length of the truck bed and the length of the tailgate in a lowered position. For such even greater lengthy loads, it would be desirable if a device were provided that enabled an auxiliary tailgate to be adjusted so that the auxiliary tailgate can be placed in a vertical orientation to help confine the even greater lengthy load.

Throughout the years, a number of innovations have been developed relating to extending the effective horizontal length of a tailgate, and the following U.S. Pat. Nos. are representative of some of those innovations: 4,023,850; 4,114,944; 4,531,773; 4,778,213; 5,113,584; and 5,116,096. Although the above-cited patents disclose devices for extending the effective horizontal length of a tailgate, none of the patented devices relate to an auxiliary tailgate that is adapted to be placed in a vertical orientation to help confine a lengthy load on a truck bed.

Still other features would be desirable in an auxiliary tailgate apparatus. Many pickup trucks are manufactured and sold every year, and it would be desirable if an auxiliary tailgate apparatus were provided on newly manufactured pickup trucks and other tailgate-containing vehicles. Moreover, there are millions of tailgate-containing vehicles currently in use. In this respect, it would be desirable if a device were provided that enabled a currently-in-use tailgate-containing vehicle to be retrofitted to include an auxiliary tailgate that can be placed in a vertical orientation to help confine a lengthy load to a truck bed.

Thus, while the foregoing body of prior art indicates it to be well known to use extensions for tailgates, the prior art described above does not teach or suggest an auxiliary tailgate apparatus which has the following combination of desirable features: (1) helps confine a lengthy load on a truck bed even though the tailgate is in a lowered position; (2) includes an auxiliary, vertically-oriented tailgate that serves to confine the lengthy load onto the track bed, even with the original tailgate in the lowered position; (3) enables an auxiliary tailgate to be adjusted so that the auxiliary tailgate can be placed in a vertical orientation to help confine an even greater lengthy load on the truck bed; (4) provides an auxiliary tailgate on newly manufactured pickup trucks and other tailgate-containing vehicles; and (5) enables a currently-in-use tailgate-containing vehicle to be retrofitted to include an auxiliary tailgate that can be placed in a vertical orientation to help confine a lengthy load to a truck bed. The foregoing desired characteristics are provided by the unique auxiliary tailgate apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides an auxiliary tailgate apparatus which is adapted for installation on an original tailgate which has a proximal end connected to a vehicle and a distal end opposite to the proximal end. The auxiliary tailgate apparatus includes a base assembly adapted to be attached to the original tailgate. The base assembly includes a left portion and a right portion. A gate assembly includes a proximal end and a distal end. A pair of pivot assemblies connect the proximal end of the gate assembly with the base assembly. A first lock assembly, supported by either the gate assembly or the base assembly, is provided for selectively locking the gate assembly in a vertical orientation with respect to the base assembly or selectively permitting the gate assembly to rotate around the pivot assemblies for permitting the gate assembly to be oriented in a non-vertical orientation with respect to the base assembly.

The first lock assembly may be supported by the base assembly and includes a lock pin assembly which includes a pin member adapted to be placed in registration with a locking well located in the gate assembly for locking the gate assembly in a vertical orientation. The first lock assembly also includes a lock spring supported by the pin member. The lock spring is adapted to urge the pin member into the locking well and includes a handle portion connected to the pin member for pulling the pin member out of the locking well for releasing the gate assembly from an orientation.

The base assembly may include a pair of fixed base units fixedly attached to the original tailgate. A pair of adjustable extension members are in sliding engagement with the pair of fixed base units, and a pair of second lock assemblies, are selectively connected between the pair of fixed base units and the pair of adjustable extension members, for locking the adjustable extension members in selected adjustments with respect to the fixed base units. The proximal end of the gate assembly and the pivot assemblies are connected to distal ends of the adjustable extension members.

The fixed base units may include hollow interiors, and the adjustable extension members fit telescopically into to the hollow interiors of the fixed base units. The adjustable extension members include a plurality of locking channels. The second lock assemblies include lock pins. The fixed base units include alignment apertures. The adjustable extension members are locked in selected adjusted lengths with respect to the fixed base units when selected locking channels are placed in registration with the alignment apertures and the lock pins are placed through the registered alignment apertures and locking channels.

The first lock assembly may be supported by an adjustable extension member and includes a lock pin assembly which includes a pin member adapted to be placed in contact with a front side of the gate assembly for locking the gate assembly in a vertical orientation, and includes a handle portion connected to the pin member for pulling the pin member out of contact with the front side of the gate assembly for releasing the gate assembly from a vertical orientation.

A gate spring may be connected to the base assembly and contacting the gate assembly. The gate spring urges the gate assembly toward a horizontal orientation. The distal end of the gate assembly is in contact with the proximal end of the original tailgate.

The base assembly further may include a pair of lock blocks connected to the distal ends of the adjustable extension members. The pivot assemblies includes pivot pins. The lock blocks include channels which permit passage therethrough of the pivot pins and include vertical locking wells permitting the gate assembly to be locked in a vertical orientation. A pair of the first lock assemblies are supported by the gate assembly.

Each of the first lock assemblies includes a lock pin assembly which includes a pin member adapted to be placed in registration with a vertical locking well located in a lock block for locking the gate assembly in a vertical orientation. A lock spring is supported by the pin member and is adapted to urge the pin member into the vertical locking well. A handle portion is connected to the pin member for pulling the pin member out of the vertical locking well for releasing the gate assembly from a vertical orientation. Each of the lock blocks further includes a horizontal locking well adapted to receive the pin member for locking the gate assembly in a horizontal orientation.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining three preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved auxiliary tailgate apparatus which has all of the advantages of the prior art and none of the disadvantages.

It is another object of the present invention to provide a new and improved auxiliary tailgate apparatus which may be easily and efficiently manufactured and marketed.

It is a further object of the present invention to provide a new and improved auxiliary tailgate apparatus which is of durable and reliable construction.

An even further object of the present invention is to provide a new and improved auxiliary tailgate apparatus which is susceptible of a low cost of manufacture with regard to both materials and labor, and which accordingly is then susceptible of low prices of sale to the consuming public, thereby making such auxiliary tailgate apparatus available to the buying public.

Still yet a further object of the present invention is to provide a new and improved auxiliary tailgate apparatus which helps confine a lengthy load on a truck bed even though the tailgate is in a lowered position.

Still another object of the present invention is to provide a new and improved auxiliary tailgate apparatus that includes an auxiliary, vertically-oriented tailgate that serves to confine the lengthy load onto the truck bed, even with the original tailgate in the lowered position.

Yet another object of the present invention is to provide a new and improved auxiliary tailgate apparatus which enables an auxiliary tailgate to be adjusted so that the auxiliary tailgate can be placed in a vertical orientation to help confine an even greater lengthy load on the truck bed.

Even another object of the present invention is to provide a new and improved auxiliary tailgate apparatus that provides an auxiliary tailgate on newly manufactured pickup trucks and other tailgate-containing vehicles.

Still a further object of the present invention is to provide a new and improved auxiliary tailgate apparatus which enables a currently-in-use tailgate-containing vehicle to be retrofitted to include an auxiliary tailgate that can be placed in a vertical orientation to help confine a lengthy load to a truck bed.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 3 is a perspective view of a second preferred embodiment of the auxiliary tailgate apparatus of the invention, installed on an original tailgate, wherein the horizontal distance between an auxiliary tailgate and the truck bed can be adjusted.

FIG. 4 is an enlarged top view of a portion of the embodiment of the invention shown in FIG. 3 taken along line 4—4 of FIG. 3.

DESCRIPTION OF THE PREFERRED EMBODIMENT

With reference to the drawings, a new and improved auxiliary tailgate apparatus embodying the principles and concepts of the present invention will be described.

Figure 1:
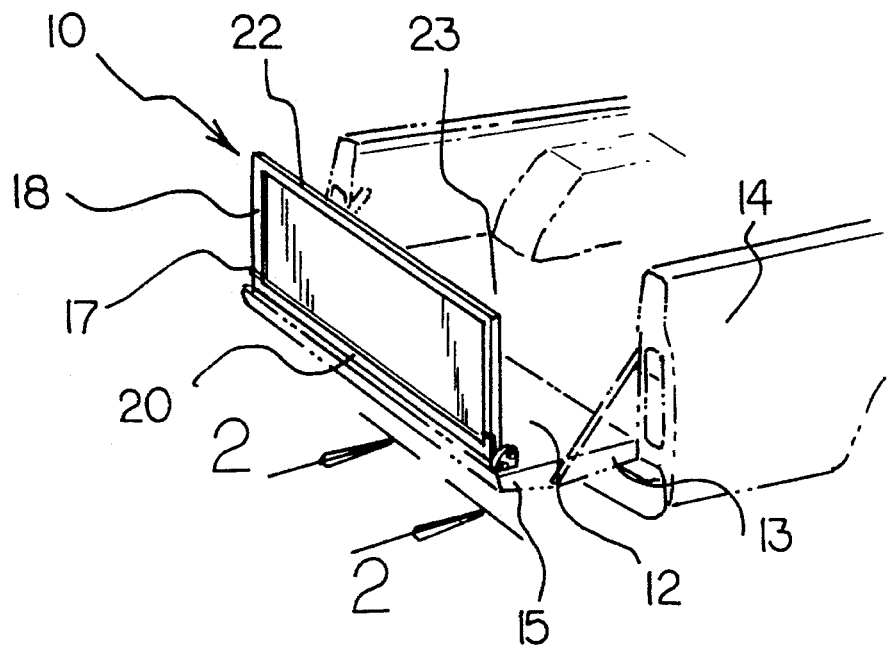
FIG. 1 is a perspective view of a first preferred embodiment of the auxiliary tailgate apparatus of the invention attached to a distal end of an original tailgate.
Figure 2:
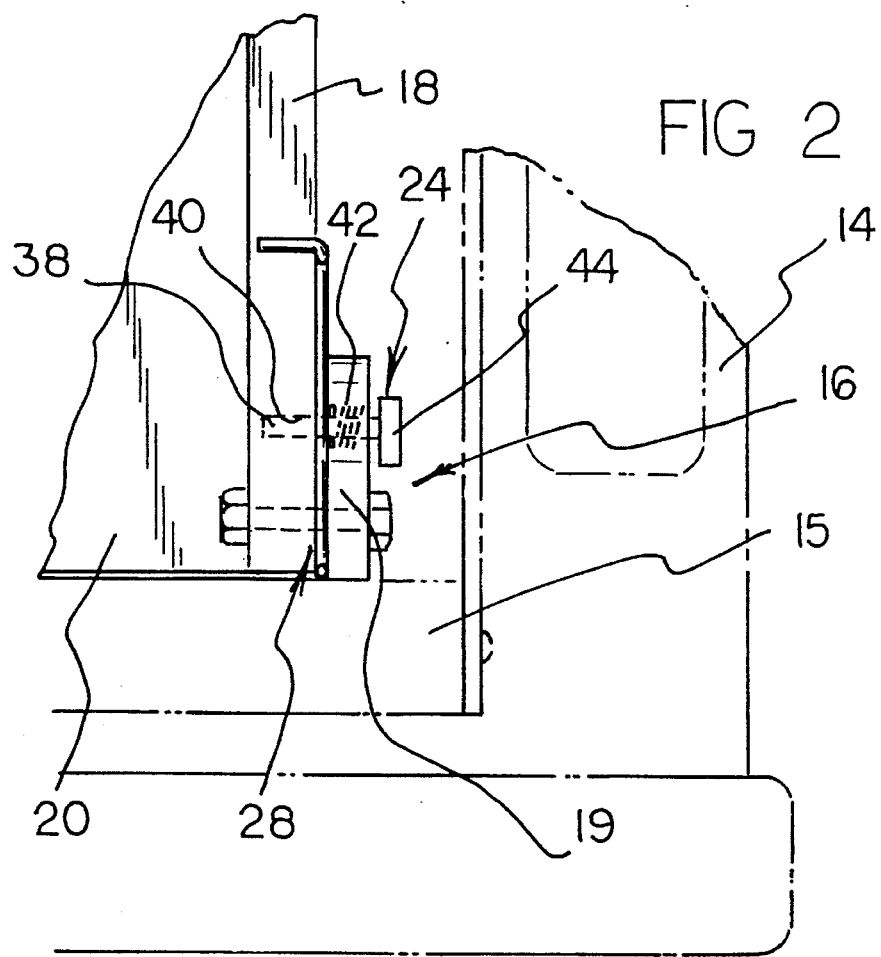
FIG. 2 is an enlarged, partial front view of the embodiment of the auxiliary tailgate apparatus shown in FIG. 1 taken along line 2—2 of FIG. 1.
Figure 5:
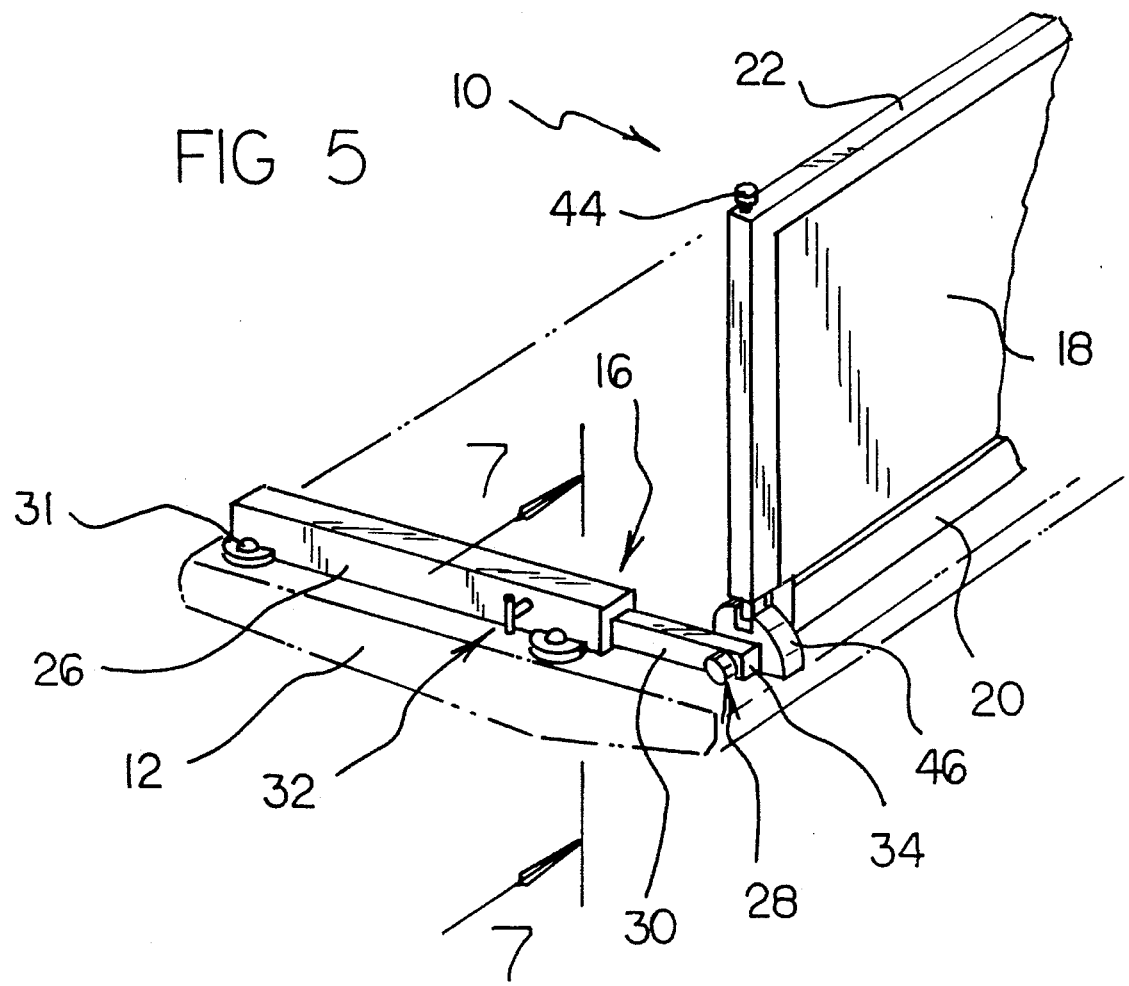
FIG. 5 is a perspective view of a third preferred embodiment of the auxiliary tailgate apparatus of the invention, installed on an original tailgate, wherein the horizontal distance between an auxiliary tailgate and the truck bed can be adjusted, and wherein the auxiliary tailgate can be released from a vertical orientation by a hand-operated release operated from the distal end of the auxiliary tailgate.

Turning to FIGS. 1–2, there is shown a first exemplary embodiment of the auxiliary tailgate apparatus of the invention generally designated by reference numeral 10. In its preferred form, auxiliary tailgate apparatus 10 is adapted for installation on an original tailgate 12 which has a proximal end 13 connected to a vehicle 14 and a distal end 15 opposite to the proximal end 13. The auxiliary tailgate apparatus 10 includes a base assembly 16 adapted to be attached to the original tailgate 12. The base assembly 16 includes a left portion 17 and a right portion 19. A gate assembly 18 includes a proximal end 20 and a distal end 22. A pair of pivot assemblies 28 connect the proximal end 20 of the gate assembly 18 with the base assembly 16. A first lock assembly 24, supported by either the gate assembly 18 or the base assembly 16, is provided for selectively locking the gate assembly 18 in a vertical orientation with respect to the base assembly 16 or selectively permitting the gate assembly 18 to rotate around the pivot assemblies 28 for permitting the gate assembly 18 to be oriented in a non-vertical orientation with respect to the base assembly 16.

The first lock assembly 24 is supported by the base assembly 16 and includes a lock pin assembly which includes a pin member 38 adapted to be placed in registration with a locking well 40 located in the gate assembly 18 for locking the gate assembly 18 in a vertical orientation. The first lock assembly 24 also includes a lock spring 42 supported by the pin member 38. The lock spring 42 is adapted to urge the pin member 38 into the locking well 40 and includes a handle portion 44 connected to the pin member 38 for pulling the pin member 38 out of the locking well 40 for releasing the gate assembly 18 from an orientation. The lock spring 42 permits the pin member 38 to be retractable. Alternatively, the first lock assembly 24 can include a simple lock screw for locking the gate assembly 18 in a vertical orientation.

In operating the embodiment of the invention shown in FIGS. 1 and 2, when the handle portion 44 of the lock pin assembly is pulled longitudinally, and the pin member 38 is pulled out of the locking well 40 on the gate assembly 18 against the urging of the lock spring 42, and the gate assembly 18 is free to rotate around the pivot assemblies 28. When the gate assembly 18 is not in use, the gate assembly 18 can be rotated clockwise, in accordance with FIG. 1, so that the distal end 22 of the gate assembly 18 rests upon the proximal end 13 of the original tailgate 12. The gate assembly 18 can be left in this position either when the original tailgate 12 is in a vertical or horizontal orientation.

When it is desired to use the auxiliary tailgate apparatus 10 of the invention, then the original tailgate 12 is lowered to a horizontal orientation, and the distal end 22 of the gate assembly 18 is lifted so that the gate assembly 18 rotates counterclockwise around the pivot assemblies 28. When the gate assembly 18 is in nearly a vertical orientation, the handle portion 44 of the lock pin assembly is pulled back to retract the pin member 38. Then the gate assembly 18 is placed in vertical orientation, and the handle portion 44 is released, thereby permitting the lock spring 42 to urge the pin member 38 of the lock pin assembly into the locking well 40 of the gate assembly 18, thereby locking the gate assembly 18 in a vertical orientation.

The handle portion 44 of the lock pin assembly can be pulled out longitudinally again causing the pin member 38 to be removed from the locking well 40. Then, the distal end 22 of the gate assembly 18 can be further rotated in a counterclockwise direction, in accordance with FIG. 1, to cause the gate assembly 18 to assume a horizontal or below horizontal orientation with respect to the horizontally oriented original tailgate 12. In this orientation, the truck bed 23 can be loaded and unloaded without interference from the gate assembly 18. After the truck bed 23 is loaded, the gate assembly 18 is rotated in a clockwise direction so that the gate assembly 18 in a vertical orientation and so that the pin member 38 of the lock pin assembly engages the locking well 40 of the gate assembly 18.

It is noted that a portion of the base assembly 16 is located on the left side of the original tailgate 12, and a portion of the base assembly 16 is located on the right side of the original tailgate 12. Likewise, a first lock assembly 24 is located on each side of the gate assembly 18. Similarly, a locking well 40 is present on each side of the gate assembly 18.

Turning to FIGS. 3–4, a second embodiment of the invention is shown. Reference numerals are shown that correspond to like reference numerals that designate like elements shown in the other figures. In addition, the base assembly 16 includes a pair of fixed base units 26 fixedly attached to the original tailgate 12 and includes a pair of adjustable extension members 30 in sliding engagement with the pair of fixed base units 26. A pair of second lock assemblies 32 is selectively connected between the pair of fixed base units 26 and the pair of adjustable extension members 30, for locking the adjustable extension members 30 in selected adjustments with respect to the fixed base units 26. The proximal end 20 of the gate assembly 18 and the pivot assemblies 28 are connected to distal ends 34 of the adjustable extension members 30. Screws 31 are used to attach the fixed base units 26 to the original tailgate 12.

The fixed base units 26 includes hollow interiors, and the adjustable extension members 30 fit telescopically into the hollow interiors of the fixed base units 26. The adjustable extension members 30 include a plurality of locking channels 47. The second lock assemblies 32 include lock pins 49. The fixed base units 26 include alignment apertures 51. The adjustable extension members 30 are locked in selected adjusted lengths with respect to the fixed base units 26 when selected locking channels 47 are placed in registration with the alignment apertures 51, and the lock pins 49 are placed through the registered alignment apertures 51 and locking channels 47.

The first lock assembly 24 is supported by an adjustable extension member 30 and includes a lock pin assembly which includes a pin member 38 adapted to be placed in contact with a front side of the gate assembly 18 for locking the gate assembly 18 in a vertical orientation, and includes a handle portion 44 is connected to the pin member 38 for pulling the pin member 38 out of contact with the front side of the gate assembly 18 for releasing the gate assembly 18 from a vertical orientation.

A gate spring 45 is connected to the base assembly 16 and contacting the gate assembly 18. The gate spring 45 urges the gate assembly 18 toward a horizontal orientation. The distal end 22 of the gate assembly 18 is in contact with the proximal end 13 of the original tailgate 12. When the gate assembly 18 is placed in a vertical orientation, as shown in FIG. 3, against the urging of the gate springs 45, then the pin members 38 of the second lock assemblies 32 keep the gate assembly 18 in the vertical orientation.

Figure 8:
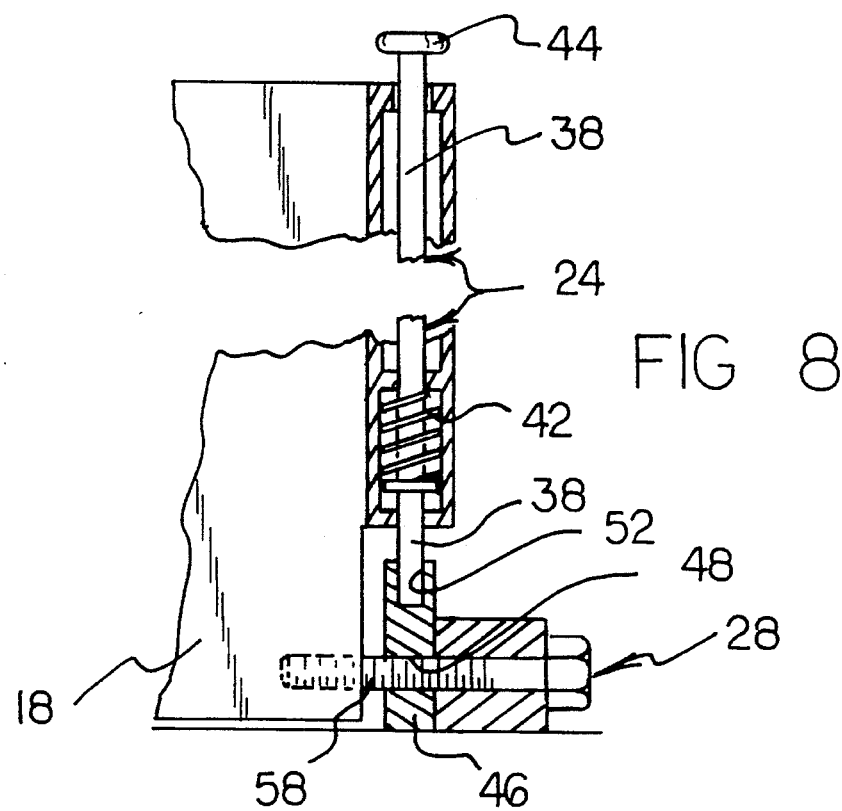
FIG. 8 is a partially enlarged, partial cross-sectional view of the embodiment of the invention shown in FIG. 7 taken along line 8—8 thereof.

Turning to FIGS. 5–8, a third embodiment of the invention is shown. Reference numerals are shown that correspond to like reference numerals that designate like elements shown in the other figures. In addition, the base assembly 16 further includes a pair of lock blocks 46 connected to the distal ends 34 of the adjustable extension members 30. The pivot assemblies 28 includes pivot pins 50. The lock blocks 46 include channels 48 which permit passage therethrough of the pivot pins 50 and include vertical locking wells 52 permitting the gate assembly 18 to be locked in a vertical orientation. As shown in FIG. 8, a pivot pin 50 is a cylindrical bolt, and a channel 48 is a cylindrical hole in a lock block 46.

A pair of the first lock assemblies 24 are supported by the gate assembly 18. Each of the first lock assemblies 24 includes a lock pin assembly which includes a pin member 38 adapted to be placed in registration with a vertical locking well 52 located in a lock block 46 for locking the gate assembly 18 in a vertical orientation. A lock spring 42 is supported by the pin member 38 and is adapted to urge the pin member 38 into the vertical locking well 52. A handle portion 61 is connected to the pin member 38 for pulling the pin member 38 out of the vertical locking well 52 for releasing the gate assembly 18 from a vertical orientation. Each of the lock blocks 46 further includes a horizontal locking well 54 adapted to receive the pin member 38 for locking the gate assembly 18 in a horizontal orientation.

In operation of the embodiment of the invention shown in FIGS. 5–8, the adjustable extension members 30 and the fixed base units 26 are adjusted with respect to each other and locked together is selected adjustments by the second lock assemblies 32 as described above. Control of the orientation of the gate assembly 18 is as follows. When the gate assembly 18 is in a horizontal orientation, with the distal end 22 of the gate assembly 18 against the proximal end 13 of the original tailgate 12, the far end of the pin member 38 of the first lock assembly 24 is in registration with the horizontal locking well 54 of the associated lock block 46. The lock spring 42 urges the far end of the pin member 38 into the horizontal locking well 54. To move the gate assembly 18 to a vertical orientation, the handle portion 61 of the first lock assembly 24 is pulled up to remove the far end of the pin member 38 from the horizontal locking well 54. Then, the gate assembly 18 is rotated around the pivot assemblies 28 in a clockwise direction, in accordance with FIGS. 5–7. When the gate assembly 18 is in a nearly vertical orientation, the handle portion 61 of the first lock assembly 24 is pulled up, and the gate assembly 18 is placed in a vertical orientation. Then, the handle portion 61 is released, permitting the lock spring 42 to urge the far end of the pin member 38 into the vertical locking well 52 of the lock block 46.

Figure 6:
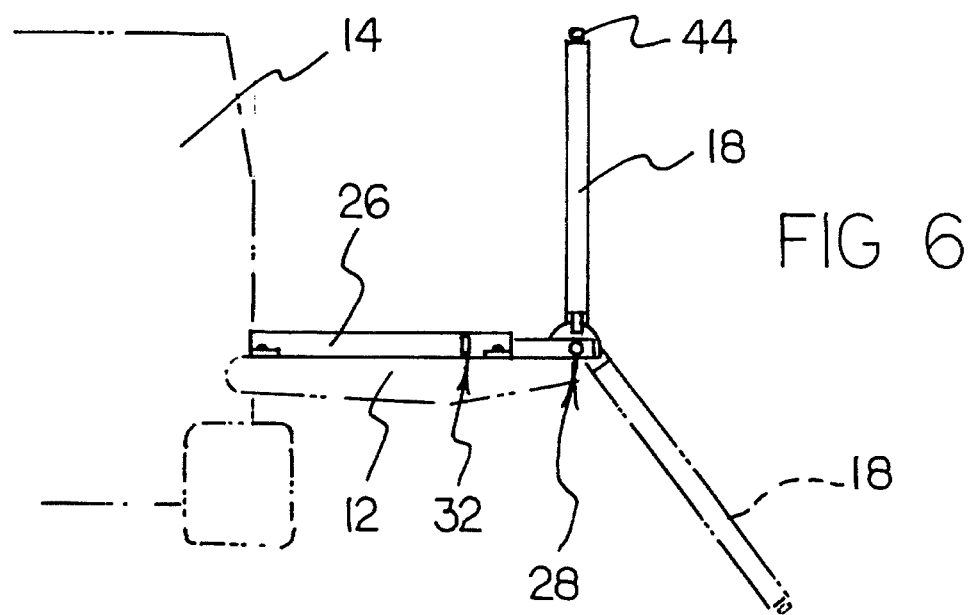
FIG. 6 is a side view of the embodiment of the invention shown in FIG. 5 showing the auxiliary tailgate in a vertical orientation in solid lines and showing the auxiliary tailgate in a below-horizontal orientation in broken lines.
Figure 7:
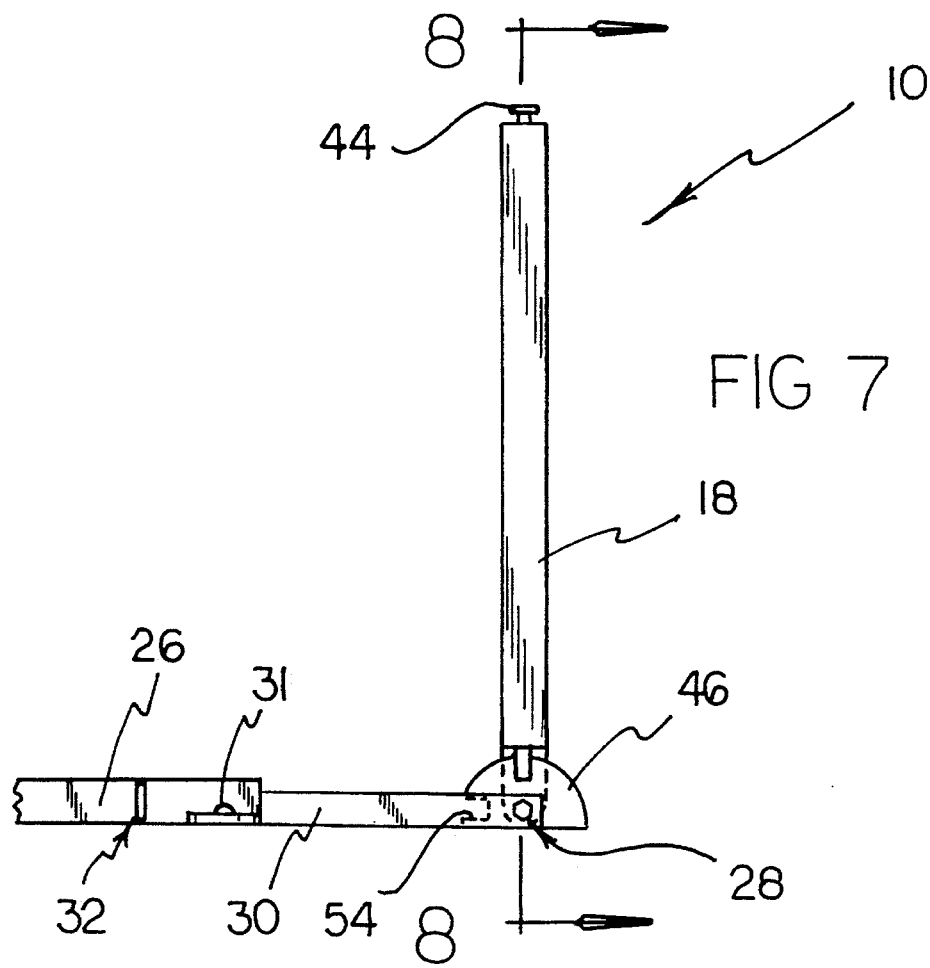
FIG. 7 is an enlarged side view of the embodiment of the invention shown in FIG. 5 taken along line 7—7 thereof.

To move the gate assembly 18 to a below horizontal orientation, as shown by the broken-lined gate assembly 18 in FIG. 6, the handle portion 61 is pulled up removing the far end of the pin member 38 from the vertical locking well 52 of the lock blocks 46. Then, the gate assembly 18 is rotated further in a clockwise direction to the below horizontal orientation by which the truck bed 23 can be easily loaded and unloaded.

The components of the auxiliary tailgate apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved auxiliary tailgate apparatus that is low in cost, relatively simple in design and operation, and which may advantageously be used to help confine a lengthy load on a truck bed even though the tailgate is in a lowered position. With the invention, an auxiliary tailgate apparatus is provided which includes an auxiliary, vertically-oriented tailgate that serves to confine the lengthy load onto the truck bed, even with the original tailgate in a lowered position. With the invention, an auxiliary tailgate apparatus is provided which enables an auxiliary tailgate to be adjusted so that the auxiliary tailgate can be placed in a vertical orientation to help confine an even greater lengthy load on the truck bed. With the invention, an auxiliary tailgate apparatus provides an auxiliary tailgate on newly manufactured pickup trucks and other tailgate-containing vehicles. With the invention, an auxiliary tailgate apparatus is provided which enables a currently-in-use tailgate-containing vehicle to be retrofitted to include an auxiliary tailgate that can be placed in a vertical orientation to help confine a lengthy load to a truck bed.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as encompass all such modifications as well as all relationships equivalent to those illustrated in the drawings and described in the specification.

Finally, it will be appreciated that the purpose of the foregoing Abstract provided at the beginning of this specification is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any

What is claimed as being new and desired to be protected by Letters Patent of the United States is as follows:

1. An auxiliary tailgate apparatus adapted for installation on an original tailgate which has a proximal end connected to a vehicle and a distal end opposite to the proximal end, comprising:

a base assembly adapted to be attached to the original tailgate, wherein said base assembly includes a left portion and a right portion, a gate assembly which includes a proximal end and a distal end, a pair of pivot assemblies connecting said proximal end of said gate assembly with said base assembly, and a first lock assembly, supported by either said gate assembly or said base assembly, for selectively locking said gate assembly in a vertical orientation with respect to said base assembly or selectively permitting said gate assembly to rotate around said pivot assemblies for permitting said gate assembly to be oriented in a non-vertical orientation with respect to said base assembly, wherein said base assembly includes, a pair of fixed base units fixedly attached to said original tailgate, a pair of adjustable extension members in sliding engagement with said pair of fixed base units, and a pair of second lock assemblies, selectively connected between said pair of fixed base units and said pair of adjustable extension members, for locking said adjustable extension members in selected adjustments with respect to said fixed base units, wherein said proximal end of said gate assembly and said pivot assemblies are connected to distal ends of said adjustable extension members.

2. The apparatus of claim 1 wherein said first lock assembly is supported by said base assembly and includes a lock pin assembly which includes a pin member adapted to be placed in registration with a locking well located in said gate assembly for locking said gate assembly in a vertical orientation, includes a lock spring supported by said pin member and adapted to urge said pin member into said locking well, and includes a handle portion connected to said pin member for pulling said pin member out of said locking well for releasing said gate assembly from an orientation.

3. The apparatus of claim 1 wherein:

said fixed base units include hollow interiors, and said adjustable extension members fit telescopically into to said hollow interiors of said fixed base units.

4. The apparatus of claim 3 wherein:

said adjustable extension members include a plurality of locking channels, said second lock assemblies include lock pins, said fixed base units include alignment apertures, and said adjustable extension members are locked in selected adjusted lengths with respect to said fixed base units when selected locking channels are placed in registration with said alignment apertures and said lock pins are placed through the registered alignment apertures and locking channels.

5. The apparatus of claim 1 wherein said first lock assembly is supported by an adjustable extension member and includes a lock pin assembly which includes a pin member adapted to be placed in contact with a front side of said gate assembly for locking said gate assembly in a vertical orientation, and includes a handle portion connected to said pin member for pulling said pin member out of contact with said front side of said gate assembly for releasing said gate assembly from a vertical orientation.

6. The apparatus of claim 1, further including:

a gate spring connected to said base assembly and contacting said gate assembly, wherein said gate spring urges said gate assembly toward a horizontal orientation wherein said distal end of said gate assembly is in contact with the proximal end of the original tailgate.

7. An auxiliary tailgate apparatus adapted for installation on an original tailgate which has a proximal end connected to a vehicle and a distal end opposite to the proximal end, comprising:

a base assembly adapted to be attached to the original tailgate, wherein said base assembly includes a left portion and a right portion, a gate assembly which includes a proximal end and a distal end, a pair of pivot assemblies connecting said proximal end of said gate assembly with said base assembly, and a first lock assembly, supported by either said gate assembly or said base assembly, for selectively locking said gate assembly in a vertical orientation with respect to said base assembly or selectively permitting said gate assembly to rotate around said pivot assemblies for permitting said gate assembly to be oriented in a non-vertical orientation with respect to said base assembly, wherein said base assembly includes a pair of fixed base units fixedly attached to said original tailgate, a pair of adjustable extension members in sliding engagement with said pair of fixed base units, and a pair of second lock assemblies, selectively connected between said pair of fixed base units and said pair of adjustable extension members, for locking said adjustable extension members in selected adjustments with respect to said fixed base units, wherein said proximal end of said gate assembly and said pivot assemblies are connected to distal ends of said adjustable extension members, wherein said base assembly further includes a pair of lock blocks connected to said distal ends of said adjustable extension members, wherein said pivot assemblies include pivot pins, wherein said lock blocks include channels which permit passage therethrough of said pivot pins and include vertical locking wells permitting said gate assembly to be locked in a vertical orientation, and wherein a pair of said first lock assemblies are supported by said gate assembly.

8. The apparatus of claim 7 wherein each of said first lock assemblies includes:

a lock pin assembly which includes a pin member adapted to be placed in registration with a vertical locking well located in a lock block for locking said gate assembly in a vertical orientation, a lock spring supported by said pin member and adapted to urge said pin member into said vertical locking well, and a handle portion connected to said pin member for pulling said pin member out of said vertical locking well for releasing said gate assembly from a vertical orientation.

9. The apparatus of claim 7 wherein each of said lock blocks further includes a horizontal locking well adapted to receive said pin member for locking said gate assembly in a horizontal orientation.

* * * * *